Dec. 20, 1938. J. H. JEFFREE 2,140,584
SCANNING DEVICE
Filed Jan. 23, 1935 2 Sheets-Sheet 1

INVENTOR
JOHN HENRY JEFFREE
ATTORNEYS

Dec. 20, 1938.   J. H. JEFFREE   2,140,584
SCANNING DEVICE
Filed Jan. 23, 1935   2 Sheets-Sheet 2

INVENTOR
JOHN HENRY JEFFREE

ATTORNEY

Patented Dec. 20, 1938

2,140,584

UNITED STATES PATENT OFFICE 2,140,584

SCANNING DEVICE

John Henry Jeffree, Bray-on-Thames, England, assignor to Scophony Limited, London, England, a company of Great Britain Application January 23, 1935, Serial No. 3,062
In Great Britain January 23, 1934

15 Claims. (Cl. 178—7.6)

This invention relates to the transmission and reception of pictures and the like, for example to television. In a television system, the picture may be considered as divided up into a number of strips, which are scanned lengthwise in a given order by one or more beams of light or light channels.

When such scanning is accomplished by moving parts of an optical system, difficulties have hitherto arisen, as will be explained hereinafter, because of the large parts and the rapid motions which have been necessary.

It is the principal object of the present invention to provide scanning apparatus in which this difficulty is reduced.

Figure 2:
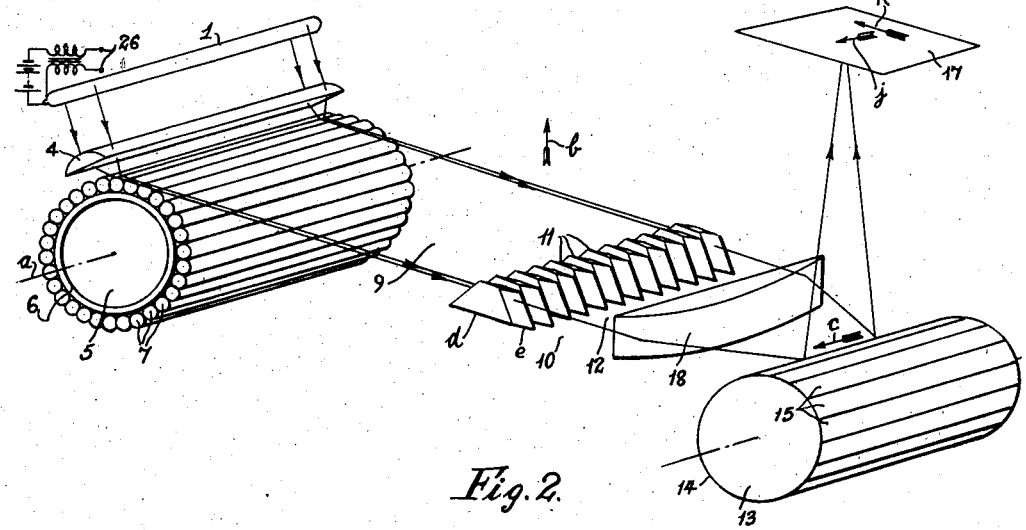
Figure 6:
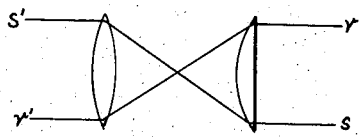
Figure 7:
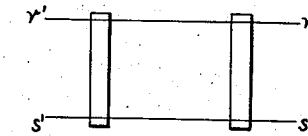
Figure 8:
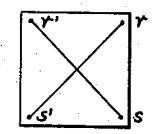
Figure 1:
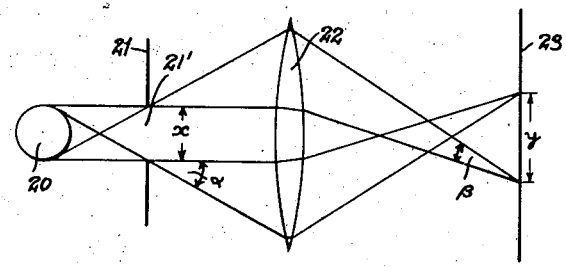
Figure 3:
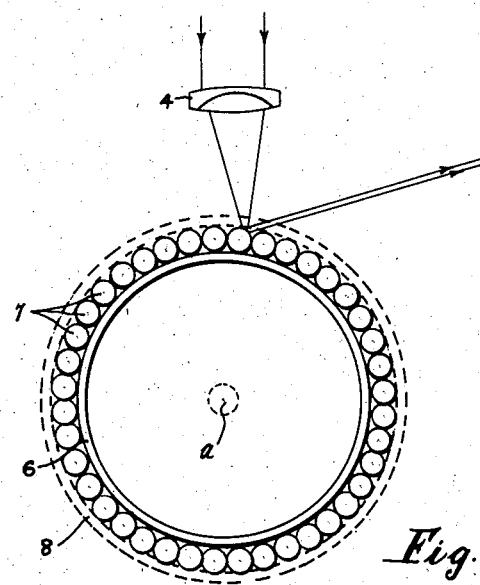

The invention will be described with reference to the accompanying drawings in which Fig. 1 is an explanatory diagram, Fig. 2 is a diagrammatic perspective view of one embodiment of the present invention, Fig. 3 is a somewhat diagrammatic view of a part of the apparatus of Fig. 2, Figs. 4 to 7 are explanatory diagrams and Fig. 8 illustrates a modification of the apparatus of Fig. 2.

Figure 9:
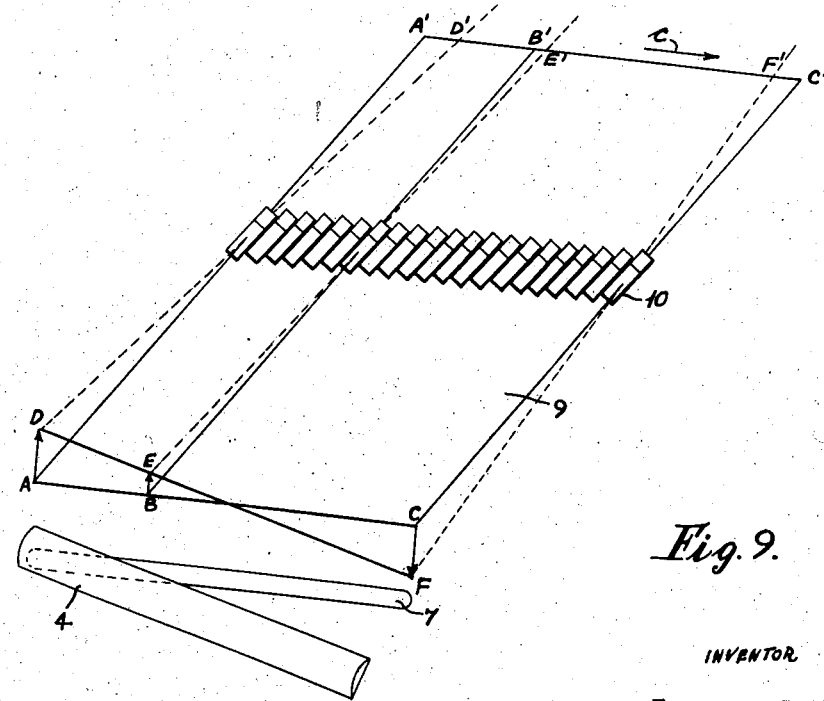

Fig. 9 illustrates the method of operation of the device shown in Fig. 2.

It is well known in optics that the quantity of light in a light beam which may be termed the "light flux" depends not only on the brightness of the source and analogous factors, but also on geometrical factors. For a symmetrical beam, either converging or diverging, this geometrical factor may be defined as the product of the area of the exit pupil into the solid angle of divergence of the beam. This factor (in the symmetrical case) remains constant, no matter what reflections or refractions the beam may undergo, so long of course as the beam is not restricted in any way by any stops or screens. This geometrical factor is hereinafter referred to as the "total light grasp". The product of the width of the exit pupil in any one direction and the angle of divergence of the beam in that direction is termed the "light grasp" in that direction. The product of the light grasp in one direction and that in a perpendicular direction gives the total light grasp of the beam.

This may be made clearer by reference to Fig. 1 of the accompanying drawings, which shows a diaphragm stop 21 having a slit aperture 21', the slit being illuminated by a light source 20. An image of this slit is formed on a screen 23, by a lens 22. In the plane of the paper, the light grasp as defined above is given by $x\alpha$, where $\alpha$ is the angle of divergence of the beam and $x$ is the width of the slit 21' in the plane of the paper. If $y$ is the width in the same plane of the image formed on the screen 23, then, assuming the angle $\alpha$ to be small, from the geometry of the figure, $$\frac{x}{y}=\frac{\beta}{\alpha}$$

where $\beta$ is the angle of convergence of the light from the lens 22. Thus $x\alpha = y\beta$; now $y\beta$ is the light grasp of the beam converging onto the screen 23, and this is equal to the light grasp of the beam emerging from the slit, as proved above. This simple example will serve to elucidate the statements given in the previous paragraph.

The mechanical difficulties met with in scanning depend more on the light grasp of the beam in the direction of scanning, than on that in the other perpendicular direction, so long as scanning in one direction only is under consideration. The method of bringing about the motions in two directions, needed in television, by separate means is known, and it is the motion in the direction along the strips which usually gives rise to greater difficulties, being usually faster. By giving the beam to be scanned a small enough light grasp in this direction, the difficulties of scanning along the strips may be reduced, even if the light grasp is correspondingly increased in the other direction in order to obtain sufficient light. It may be necessary, in order to obtain this increased light grasp, to use a beam having definition only in the direction of scanning along the strips, as in U. S. patent application Serial No. 400,883.

Beyond a certain point, however, the increased light grasp in the direction perpendicular to that of scanning along the strips introduces difficulty in obtaining the second scanning motion from one strip to another, since even if this motion be slower, it may necessitate the use of very large optical parts. The advantage gained in one scanner thus involves a corresponding disadvantage in the other.

The apparatus described below and shown in diagram in Fig. 2 is one suitable for the reproduction of pictures from received picture signals, which are caused to modulate a light source 1 in any known or suitable manner. The signals may for example be applied to terminals 26. The light from this source 1 falls on the cylindrical lens 4 which focuses the beam as a line of light on to one element 7 of a first scanner 5, which gives the faster scanning motion. This scanner may consist of a cylinder 6 of metal shown in end view in Fig. 2 mounted so that it is capable of being rotated at high speed on its axis $a$, and having a number of highly polished cylindrical metal rods 7 mounted round its circumference at equal distances from each other, with their axes parallel to that of the central cylinder. The rods may preferably be of such a diameter, that they are in close contact with each other, and with the central cylinder 6, and may be fastened thereto with shrunk-on metal rings 8.

By suitably adjusting the position of the lens 4 (Figs. 2 and 3) with respect to the scanner 5, the reflected light from the rods 7 may be made to emerge as a nearly flat beam or sheet of light 9, of small thickness and light grasp in one direction (that indicated by arrow $b$), and of large light grasp in the other direction parallel to axis $a$. By this rotation of the scanner 5 the beam is given movements in the direction of the arrow $b$, that is, in the direction of its smaller light grasp. This movement given by the mirror drum is an angular motion, the center of which is lying a short distance behind the surface of the rotating elements of the drum. Therefore beam 9 has an angular movement approximately about the center of the rod 7 in the direction of the arrow $b$. The sheet of light now falls on the optical arrangement 10, which may be called a transforming device, devised as will be described in the following paragraph so that the direction of the movements of the emerging beam 9 is changed from movement in the direction of its smaller light grasp as shown by the arrow $b$, to movement in the direction of its larger light grasp as shown by the arrow $c$. The beam 9 having passed these transforming devices 10 emerges as beam 12 in the direction of the arrow $c$ and has now an angular motion the center of which lies approximately in the middle point of the axis of rod 7.

The transforming device 10 for changing the direction of motion of the beam may consist of an echelon device built up of a set of narrow staggered optical elements 11 each in the form of a right angle prism, with the longer dimension $d$ of the hypotenuse face parallel to the direction of the incident beam, and the shorter dimension $e$, and the planes of the optical elements inclined at an angle of 45° to the plane of the beam. The methods of manufacture of stepped echelon devices shown in U. S. patent application Serial No. 400,883 may be applied in the construction of these transforming devices.

Figure 4:
Figure 5:

Fig. 4 illustrates the optical result of passing a moving beam of light through such a prism. $p$ and $q$ are two beams incident on the prism; they are refracted at the entrant surface $f$ and strike the hypotenuse $g$ at an angle less than the critical angle and are therefore reflected again to the third face $h$, where they are refracted and emerge at $p'$ and $q'$. It will be noted that their relative positions are now inverted. Consequently a beam falling on the prism in the above manner and having a movement from position $p$ to position $q$ will move in the opposite direction, i. e. from $p'$ to $q'$ after passing through the prism. Any movements that the beam may undergo in a direction at right angles to the plane of the figure will clearly not be altered. Reference to Fig. 5, which is an end elevation of Fig. 4, shows what will happen to a beam moving in a direction at 45° to the plane of the paper in Fig. 4. One component of the movement will not be changed, the other component at right angles to the first will be changed through 180°. The emerging beam will then have its direction of motion changed through 90°, i. e. instead of moving in the direction $p$—$q$, it will move in the direction $p'$—$q'$.

Returning now to Fig. 2, each part of the beam moving in the direction of the arrow $b$ will after passing through the transforming device 10 move in the direction $c$, and the emerging beam 12 as a whole will have this movement.

The emergent beam 12 is allowed to fall on the cylindrical lens 18, which has correct focal power to focus it upon the screen 17. From this lens it falls on the scanner 13, which consists of a mirror drum of known form, comprising a cylinder 14 round the circumference of which are mounted plane mirrors 15 having their lengths parallel to the axis $d$ of the drum.

The beam reflected from a mirror of this scanner 13 is thrown onto the screen 17. Thus the effect of rotation of the scanner 5 is to cause the spot formed on the screen 17 to move across the screen in the direction $j$. The effect of the drum 13 is to move the spot more slowly in the direction $k$. If these scanners 5 and 13 are moved at the correct speeds (dependent upon the corresponding scanning speeds at the transmitter) a picture will be reproduced upon the screen.

Clearly the apparatus described can be used as a transmitter, for example by maintaining the light source 1 at constant intensity and arranging the object to be scanned in plane of the screen 17. A suitable photo-electric cell is then arranged to receive light reflected from (or in the case of a transparency transmitted through) the object. The apparatus is equally applicable to the case where an object is placed in the position of the screen 17 in Fig. 2, and a photo-electric cell is placed in the position of the light source 1. Suitable lenses and the like may be inserted as necessary to focus an image of the instantaneously operative point of the object placed at 17 onto a photo-electric cell at 1.

It is not necessary that either of the scanning devices 5 or 13 for producing deflections in the beam should be of other than previously known forms, but since this invention renders possible the control of a far greater amount of light than was previously usual, it is convenient to depart from these earlier forms, and to employ, in the case of the first scanner, some such type as has been described above. The number of rods mounted on the cylinder 6 need not equal the number of strips in the picture to be reproduced, but it is merely necessary that the speed of rotation of the cylinder should be such, that the frequency of passage of a line of light across the field of the transforming device should correspond to the frequency of passage of the scanning spot from one strip to another. By the use of fewer rods than there are picture strips, it is possible to control enough light for a very large picture with a comparatively small scanning device, especially since such a device as is here described is very strong mechanically and may be subjected with safety to the stresses arising from high speeds of rotation.

Alternative scanning devices may make use of cylindrical lenses, or plane or cylindrical mirrors, similarly mounted around a cylinder, and having lengths along the cylinder axis comparatively large in relation to their widths around the circumference, and preferably mounted so that the edge of each lens or mirror is in close contact with that of the next in order around the cylinder, since by accurate manufacture a means of accurate location may thereby be provided as also in the case of the rod scanner 5 of Figs. 2 and 3. Various forms of such a device may be used, with or without stationary cylindrical optical systems, for the production of a rapidly moving beam. Yet a further device consists of an oscillating mirror, of width across the direction of oscillation small compared with its length in the direction of the axis of oscillation, the mirror serving to deflect a beam which may have definition only in the direction of deflection and large light grasp in the other direction.

In the case of the second scanner, which is used to impart the slower motion of scanning, it is not necessary to have it so rigid as the first and the moving optical parts may be larger.

Neither in the case of the first scanner nor in that of the second is the invention limited to the particular forms described, since a great number of forms of scanning devices are known or can be devised suitable for use in this invention, and these may include certain of those described in U. S. patent application Serial No. 400,883.

The components of the transforming device 10 need not necessarily be in the form of prisms; they may for example be cylindrical lenses. Figs. 6, 7 and 8 show, as in Figs. 4 and 5, how such lens systems produce the same effect as prisms. Figs. 6 and 8 are comparable with Figs. 4 and 5 respectively and Fig. 7 is a plan view of Fig. 6. In Figs. 6 to 8 the entrant rays are indicated by $r$ and $s$ and the corresponding emergent rays by $r'$ and $s'$ respectively. Lenticular elements may therefore be used in place of prism elements to form a transforming device. In the example shown in Figs. 6 to 8 two echelon devices will clearly be required.

In the description hitherto given it has been explained how the direction of movement of a light beam may be changed, with the aid of a transforming device such as 10 in Fig. 2, the direction of smaller light grasp remaining unchanged. More broadly the phenomenon may be described as the changing of the direction of movement of a light beam relatively to the direction of its smaller or larger light grasp. That is to say transforming devices of the type comprising a multiplicity of units can be arranged to change the direction of smaller light grasp whilst leaving the direction of motion of the beam unaltered. Devices of this kind can also be arranged to change both the direction of motion and also the direction of smaller light grasp in opposite senses so that the relative change of direction is about 90°.

One transforming device for effecting a change of direction of smaller light grasp without changing the direction of movement of a light beam can be arranged as follows:

The aperture of the beam is assumed to be divided into a multiplicity of elements arranged in a line and it is desired to displace the aperture elements into a different arrangement, for example one in which the elements are arranged in a line prependicular to the first line. Such a lateral displacement can be produced by optical elements equal in number to the assumed number of aperture elements, each of these optical elements being adapted to produce a lateral displacement of the corresponding beam element from its initial to its final position. Thus each optical element may comprise a glass or similar rod having plane end faces parallel to one another but suitably inclined to the direction of the incident beam element. The rods may be of rhomboidal, nearly square cross-section and of progressively changing lengths.

Thus, assuming a sheet of light as shown in Fig. 2 having movement in the direction of arrow $b$ to be applied to a transformer of the kind set forth in the preceding paragraph, after passing through the transformer, the direction of movement of the beam will be unchanged but the direction of smaller light grasp, which was initially parallel to $b$, is now at 90° to this. Thus there has been produced by the transformer a change in the direction of movement of the beam relatively to the direction of smaller light grasp.

In the case of the devices for effecting transformation of the beam, it may usually be convenient to have the beam focused substantially at infinity, but the invention is not limited to this case. For example, certain practical advantages can be obtained by making use of small deviations from parallelism of the beam, before transformation, to bring about focusing after transformation. An instance of this is where the beam, before transformation, has a comparatively large diameter in the direction of its larger light grasp, supposed horizontal, and is given a slight twist, so that at one end of this diameter, i. e. at one edge of the beam, it had a slightly upward direction and at the other edge a slightly downward one relative to its mean direction, as is illustrated in Fig. 9. This figure shows the parts of Fig. 2 essential to the present consideration. In Fig. 9 there are shown one of the rods 7 of the scanner 5, the condensing lens 4 (displaced as will hereinafter be explained), the light beam 9 reflected from the scanner, and the transforming device 10, all comparable with corresponding parts in Fig. 2. ABC represents a line in the beam and perpendicular to its mean direction which would be reflected from the rod 7 if the lens 4 were in the same position as in Fig. 2. The beam passes through the transforming device 10 (which may be of the kind shown at 10 in Fig. 2) in the directions AA', BB', CC', shown by the full lines. The lens 4 is, however, twisted, from the position shown in Fig. 2, in the plane of its planar face, so that the light focused by it falls obliquely on the rod 7. The effect of this is to rotate the line ABC into the position DEF, the beam at the device 10 however remaining in its former plane. Thus the effect of the twisting of lens 4 is to move the part of the beam passing through A to D and this part of the beam will therefore, for reasons already given, be turned through 90° when passing through the transforming device 10. The beam from D will therefore emerge along the dotted line passing through D'. Similar deflections of the parts of the beam passing through E and F will give similar results, the part through E appearing at E' and that at F appearing at F' and the beam as a whole will be seen to have been made convergent. This effect may be used to obviate the necessity for the lens 18 in Fig. 2. This converging beam may clearly be given motion in the direction of the arrow $c$, resulting from the rotation of the scanner 5.

In the apparatus illustrated in Fig. 2 the fixed optical parts such as condensing lenses and the like may be placed in any suitable position according to convenience. For instance, if a narrow sheet of light from a suitable lens system and apertures is allowed to fall on the rod scanner 5, it will be reflected as a beam having a divergence in the direction of its smaller light grasp;

this diverging beam may then be rendered parallel by a cylindrical lens of suitable focal length placed between the scanner 5 and the transforming device 10.

The invention is equally applicable when several beams, instead of one, are handled simultaneously by all or any of its parts. It is further to be understood that in place of light beams may be understood throughout also light channels or viewing channels, such for instance as are adapted to receive light from different parts of a scene or picture, as in the case of certain transmitting devices for television.

I claim:

1. Scanning apparatus for producing motion of a scanning beam in two directions, for use for television, picture telegraphy and the like purposes, comprising means for developing a beam having a larger light grasp in a first direction than in a second direction perpendicular to said first one, and arranged in the path of said beam, in the order named, a first scanner for producing motion of said beam in said second direction, a transforming device for changing the direction of said motion through substantially 90° relatively to the directions of larger and smaller light grasps of said beam, said device comprising a plurality of juxtaposed individual optical elements arranged across the path of said beam and each affecting a different portion of said beam, and a second scanning device for producing motion of said beam also in said second direction.

2. Scanning apparatus for causing a beam of light to sweep over an area, for use for television, picture telegraphy and the like purposes, comprising a first scanning device for producing motion of said beam at a relatively high speed in one direction, a transforming device arranged in and substantially permeable by light in the direction of the path of the light from said first scanning device for changing the direction of motion of said beam relative to the beam itself through an angle less than 180°, said transforming device comprising a plurality of adjacent optically active elements in staggered formation, each of said elements affecting a different portion of said beam, and a second scanning device arranged in the path of the light from said transforming device for producing motion of said beam at a relatively low speed in said second direction.

3. Scanning apparatus for causing a beam of light to sweep over an area, for use for television, picture telegraphy and the like purposes, comprising means for developing a beam having a smaller light grasp in one direction than in a second direction substantially perpendicular to said first one, a first scanning device for producing motion of said beam in said first direction at a relatively high speed, a transforming device for changing the direction of motion of said beam through substantially 90° and a second scanning device for producing motion of said beam in said first direction, said transforming device comprising a plurality of like optical elements arranged with one surface each in juxtaposition and staggered relatively to one another, the planes of said surfaces being inclined at an angle of substantially 45° to said directions, and each of said elements affecting a different portion of said beam.

4. Scanning apparatus according to claim 3, wherein each of said elements is in the form of a substantially right-angled prism.

5. Scanning apparatus according to claim 3, wherein each of said elements is in the form of a cylindrical lens.

6. Scanning apparatus for producing motion of a scanning beam in two directions, for use for television, picture telegraphy and the like purposes, comprising means for developing a beam having a smaller light grasp in one direction than in a second direction perpendicular to said first one, and arranged in the path of said beam, in the order named, a first scanner for producing motion of said beam in the first named direction; a transforming device substantially permeable by light in the direction of said path for changing said beam having motion in the direction of its smaller light grasp into a beam having corresponding motion in the direction of its larger light grasp, said device comprising a plurality of juxtaposed individual optical elements arranged across the path of said beam and each affecting a different portion of said beam; and a second scanning device for producing motion of the last named beam in the direction of its smaller light grasp.

7. Scanning apparatus for producing motion of a scanning beam in two directions for use for television, picture telegraphy and like purposes, comprising means for developing a light beam having a smaller light grasp in one direction than in a second direction substantially perpendicular to said first one, and arranged in the path of said beam two deflecting devices arranged in series and mounted for movement about parallel axes and an optical transforming device disposed between said deflecting devices for changing the direction of said light grasps and of the motion of said beam relative to each other, said device comprising a plurality of juxtaposed individual optical elements arranged across the path of said beam and each affecting a different portion of said beam.

8. A scanning apparatus for producing motion of a scanning beam in two directions, for use for television, picture telegraphy and like purposes, comprising means for developing a beam of desired dimensions, two scanners mounted for movement about parallel axes and arranged in the path of said beam one behind the other and spaced from each other, and an optical transforming device arranged in said path between said scanners, for changing the direction of the motion of the beam relative to the beam itself.

9. A scanning apparatus for causing a beam of light to sweep over an area, particularly for use in television, picture telegraphy and the like purposes, comprising means for developing a beam of light having a smaller light grasp in one direction than in a second direction substantially perpendicular to the first direction, a first scanning device for producing motion of said beam in the direction of its smaller light grasp, a transforming device for changing the direction of motion of light emerging from said first scanning device through substantially 90° relatively to said directions of smaller and larger light grasp, and a second scanner positioned to receive light from said transforming device and capable of producing motion thereof substantially in the direction of its smaller light grasp, said transforming device comprising a plurality of reflecting elements arranged across the path of said beam, each of said elements reflecting a different part of said beam, and the reflecting surfaces of said elements being arranged substantially parallel to one another in different planes and at an angle of substantially 45° to the directions of smaller and larger light grasp of the light incident thereon.

10. A scanning apparatus for causing a beam of light to sweep over an area, particularly for use in television, picture telegraphy and the like purposes, comprising means for developing a beam of light having a smaller light grasp in a first direction than in a second direction perpendicular to said first one, a first scanning device for producing motion of said beam in the direction of its smaller light grasp, a transforming device for changing the direction of motion of light emerging from said first scanning device through substantially 90° relatively to said directions of smaller and larger light grasp, and a second scanner positioned to receive light from said transforming device and capable of producing motion thereof substantially in the direction of its smaller light grasp, said transforming device comprising cylindrical optical lenses arranged across the path of said beams so that each of said lenses is traversed by a different part of said beam, and the axes of symmetry of said lenses being arranged substantially parallel to one another and at an angle of substantially 45° to said directions of smaller and larger light grasp of the light incident thereon.

11. A scanning apparatus for producing motion of a light beam in two directions, said apparatus comprising, arranged in a light path in the order named, a first scanner, a transforming device and a second scanner, said transforming device comprising a plurality of optical elements arranged across said light path so that each of said elements is operative upon a different part of said path, each of said elements being constituted to effect a twisting of the part of said light beam incident thereon about an axis approximately parallel to the direction of said path.

12. A scanning apparatus for producing motion of a light beam in two directions, comprising in the path of said light beam in the order named, a first scanner, an optical transforming device and a second scanner, said device consisting of a light refracting medium substantially permeable by light in the direction of said path and provided with surfaces in said path capable of twisting said light beam about an axis approximately concident with the direction of said path, said scanners producing motion of said light beam in one and said transforming device in another direction.

13. A scanning apparatus for producing motion of a light beam in two directions, comprising in the path of said light beam in the order named, a first scanner, an optical transforming device and a second scanner, said device consisting of a light refracting medium substantially permeable by light in the direction of said path and provided with surfaces in said path for twisting said light beam, said scanners producing motion of said light beam in one and said transforming device in another direction.

14. A scanning apparatus for producing motion of a light beam in two directions, comprising in the path of said light beam in the order named, a first scanner, an optical transforming device and a second scanner, said device comprising a plurality of adjacent optical elements of a light refracting medium and substantially permeable by light in the direction of said path, said elements arranged across said light path so that each of said elements is operative upon a different part of said light beam, each element provided with surfaces in said light path so as to twist the part of said light beam passing said element about an axis approximately coincident with the direction of said path, said scanners producing motions of said light beam in one and said transforming device in another direction.

15. A scanning apparatus for producing motion in two directions of a light beam having a larger light grasp in one direction and a smaller light grasp in another direction, comprising in the path of said light beam in the order named, a first scanner, an optical transforming device, a collecting lens and a second scanner, said device comprising a plurality of adjacent optical elements arranged across said light path in the direction of said larger light grasp, each element operative upon a different part of said beam and consisting of a light refracting medium substantially permeable by light in the direction of said path and provided with a surface capable of twisting a part of said light beam passing said element about an axis approximately coincident with the direction of said path, said first scanner producing motion of said light beam substantially in the direction of its smaller light grasp relative to and through said transforming device, said device twisting the parts of said light beam being moved there-through and thereby changing the direction of movement of said entire light beam through said collecting lens, said second scanner causing motion of said thus diverted and collected beam substantially in the direction of its smaller light grasp.

JOHN HENRY JEFFREE.